(12) United States Patent
Tanimoto et al.

(10) Patent No.: US 12,263,532 B2
(45) Date of Patent: Apr. 1, 2025

(54) GEAR MANUFACTURING APPARATUS AND GEAR MANUFACTURING METHOD

(71) Applicant: JTEKT CORPORATION, Kariya (JP)

(72) Inventors: Yoshiki Tanimoto, Seto (JP); Norikazu Sawada, Toki (JP); Kenichi Maruyama, Seto (JP); Ryouta Murakami, Seto (JP)

(73) Assignee: JTEKT CORPORATION, Kariya (JP)

(*) Notice: Subject to any disclaimer, the term of this patent is extended or adjusted under 35 U.S.C. 154(b) by 486 days.

(21) Appl. No.: 17/707,508

(22) Filed: Mar. 29, 2022

(65) Prior Publication Data
US 2022/0395919 A1 Dec. 15, 2022

(30) Foreign Application Priority Data
Jun. 10, 2021 (JP) ................................. 2021-097297

(51) Int. Cl.
*B23F 1/06* (2006.01)
(52) U.S. Cl.
CPC ..................... *B23F 1/06* (2013.01)
(58) Field of Classification Search
CPC .... B23F 1/06; B23F 1/023; B23F 5/04; B23F 19/002; B23F 19/007; B23F 19/005
See application file for complete search history.

(56) References Cited

U.S. PATENT DOCUMENTS

| | | | | |
|---|---|---|---|---|
| 2,277,041 A * | 3/1942 | Drummond | ............ | B23F 19/007 409/32 |
| 2,897,634 A * | 8/1959 | Wildhaber | ........... | B23F 23/1225 451/147 |
| 4,850,155 A * | 7/1989 | Sulzer | .................... | B23F 19/007 451/148 |
| 5,681,207 A * | 10/1997 | Nishida | ................. | B23F 19/002 451/48 |
| 6,632,052 B2 * | 10/2003 | Moeri | .................... | B23F 23/006 409/26 |

(Continued)

FOREIGN PATENT DOCUMENTS

| | | |
|---|---|---|
| JP | 2017-205871 A | 11/2017 |
| WO | 2020/110084 A1 | 6/2020 |

OTHER PUBLICATIONS

Sep. 12, 2022 Search Report issued in European Patent Application No. 22164969.2.

*Primary Examiner* — Alan Snyder
*Assistant Examiner* — Reinaldo A Vargas Del Rio
(74) *Attorney, Agent, or Firm* — Oliff PLC

(57) ABSTRACT

A gear manufacturing apparatus for machining a gear workpiece wherein, when at least one of end regions in a tooth trace direction of each tooth of the workpiece is machined, a control device executes a specific machining control for adjusting a relative position of a tool to the workpiece based on information about the relative position computed by setting, as a machining reference position, a position of the tool on an outer edge line in an X-axis-orthogonal cross section different from a normal machining point such that a distance between a center of the tool and a center of the gear workpiece in the X-axis-orthogonal cross section when the at least one of the end regions is machined is larger than when the at least one of the end regions is machined by setting the normal machining point as the machining reference position.

4 Claims, 4 Drawing Sheets

(56) References Cited

U.S. PATENT DOCUMENTS

| | | | |
|---|---|---|---|
| 10,773,356 B2* | 9/2020 | Wuerfel | B24B 51/00 |
| 11,819,935 B2* | 11/2023 | Schieke | B23F 19/05 |
| 2013/0280990 A1 | 10/2013 | Geiser et al. | |
| 2013/0288576 A1* | 10/2013 | Yanase | B23F 19/002 |
| | | | 451/47 |
| 2018/0202484 A1* | 7/2018 | Olson | F16C 3/02 |
| 2019/0111505 A1 | 4/2019 | Geiser et al. | |
| 2019/0217406 A1* | 7/2019 | Zhang | B23F 1/06 |
| 2019/0388986 A1 | 12/2019 | Vogel | |
| 2021/0008653 A1 | 1/2021 | Yoshinaga et al. | |

* cited by examiner

WORKPIECE RADIAL DIRECTION

TOOTH TRACE DIRECTION

GEAR MANUFACTURING APPARATUS AND GEAR MANUFACTURING METHOD

CROSS REFERENCE TO RELATED APPLICATION

The present application claims priority to Japanese Patent Application No. 2021-097297, which was filed on Jun. 10, 2021, the disclosure of which is herein incorporated by reference in its entirety.

BACKGROUND

Technical Field

The present disclosure relates to a gear manufacturing apparatus and a gear manufacturing method.

Description of Related Art

For instance, Patent Document 1 (Japanese Patent Application Publication No. 2017-205871) discloses a gear manufacturing method. Grinding of a gear is performed by rotating a gear workpiece and a grinding tool in mesh with each other. It is known that a crowning and end relief(s) are formed on the gear tooth surface for smooth meshing.

SUMMARY

Machining of teeth of the gear workpiece is performed with a threaded grinding wheel, for instance. A gear manufacturing apparatus performs machining of the gear workpiece by rotating the gear workpiece and the tool in a state in which teeth of the gear workpiece and teeth of the tool are in mesh with each other. In a case where a threaded grinding wheel is used to form the crowning and the end relief(s) on the tooth of the gear workpiece, the grinding wheel and the tooth surface may interfere at a position different from an intended target position, so that there may occur a phenomenon in which the tooth surface is ground at a portion not targeted. It is noted, however, that the amount of machining of the tooth surface when the crowning is formed is small. Thus, even if the tooth surface is machined at the portion not targeted, the machined amount is considerably small and accordingly negligible.

In recent years, a casing for accommodating gears has a reduced weight, namely, a small wall thickness. Thus, bending of the casing may influence meshing of the gears, i.e., the surface pressure. For instance, bending of the casing or bending of the gears themselves causes an increase in the surface pressure of contact surfaces of mutually engaging teeth at end portions thereof in a tooth trace direction. This may cause damage to the teeth. For avoiding such an increase in the surface pressure, it is considered to grind the end portions of each tooth in the tooth trace direction by a large amount to form end reliefs or crowning larger than conventional end reliefs or crowning, namely, it is considered to provide a larger relief shape, for instance. This prevents or reduces an increase in the surface pressure due to bending of the casing.

Formation of the large end relief(s) inevitably leads to an increase in the amount of machining of the tooth surface. This may cause an increase in the machined amount of the portion of the tooth surface not targeted for grinding. That is, the shape of the tooth surface is likely to largely deviate from a target shape. To avoid this, it is considered to use a small-diameter tool capable of machining detailed portions.

The use of the small-diameter tool, however, may lead to an increase in cost because of the short life of the small-diameter tool. In a case where the small-diameter tool is used in place of a large-diameter tool, it is necessary to increase the rotational speed of the apparatus for maintaining the peripheral speed of the tool. This causes the need for a high-performance apparatus. Thus, formation of the large end relief(s) with the small-diameter tool requires frequent replacement or changeover of the tools and a use of the high-performance apparatus and is accordingly problematic in terms of manufacturing cost and efficiency.

Accordingly, an aspect of the present disclosure is directed to a gear manufacturing apparatus and a gear manufacturing method capable of forming an end relief(s) on teeth while preventing a reduction in manufacturing efficiency and an increase in manufacturing cost.

In one aspect of the present disclosure, a gear manufacturing apparatus for machining a gear workpiece over an entire circumference thereof in a state in which the gear workpiece and a tool for grinding or cutting are in contact with each other and are rotated includes:
  a first spindle configured to hold the gear workpiece;
  a first holding table holding the first spindle such that the first spindle is rotatable about a first axis that is an axis of the first spindle;
  a second spindle configured to hold the tool including one or more screw-like or ring-like teeth formed on an outer circumferential surface of the tool;
  a second holding table holding the second spindle such that the second spindle is rotatable about a second axis that is an axis of the second spindle;
  a drive device configured to rotate the second spindle about the second axis and to move at least one of the first holding table and the second holding table; and
  a control device configured to control the drive device to adjust a relative position of the tool to the gear workpiece;
  wherein the control device includes a storage storing target-shape data relating to a target shape of teeth of the gear workpiece and tool-shape data relating to a shape of the tool,
  wherein a direction orthogonal to an imaginary plane that includes the second axis and that is parallel to the first axis is defined as an X-axis direction,
  wherein, in each of the target-shape data and the tool-shape data, a cross section of each of the one or more teeth of the tool cut along a plane orthogonal to the X-axis direction at a position at which at least one of the teeth of the gear workpiece is included is defined as an X-axis-orthogonal cross section,
  wherein a direction orthogonal to a tooth trace direction in the X-axis-orthogonal cross section is defined as a thickness direction,
  wherein a direction orthogonal to a straight line parallel to the first axis in the X-axis-orthogonal cross section is referred to as a Z-axis direction,
  wherein each of the one or more teeth of the tool is shaped in the X-axis-orthogonal cross section such that a length of each of the one or more teeth in the thickness direction decreases from a central portion thereof in the tooth trace direction toward opposite ends thereof in the tooth trace direction,
  wherein, in the X-axis-orthogonal cross section, an intersection between an imaginary straight line and an outer edge line of the tool is defined as a normal machining point, the imaginary straight line passing a center point of the central portion in the thickness direction and parallel to the Z-axis direction, wherein a computational position at which the tool performs machining of the gear workpiece is defined as a machining reference position, wherein each of the teeth of the gear workpiece has opposite end portions in the tooth trace direction, each of the opposite end portions being defined as an end region, and wherein, when at least one of the end regions is machined, the control device executes a specific machining control for adjusting the relative position based on information about the relative position computed by setting, as the machining reference position, a position of the tool on the outer edge line in the X-axis-orthogonal cross section different from the normal machining point such that a distance between a center of the tool and a center of the gear workpiece in the X-axis-orthogonal cross section when the at least one of the end regions is machined is larger as compared with a case in which the at least one of the end regions is machined by setting the normal machining point as the machining reference position.

In another aspect of the present disclosure, a gear manufacturing method using a gear manufacturing apparatus configured to machine a gear workpiece over an entire circumference thereof in a state in which the gear workpiece and a tool are in contact with each other and are rotated, wherein a direction orthogonal to an imaginary plane that is parallel to a first axis and that includes a second axis is defined as an X-axis direction, the first axis being a rotation axis of the gear workpiece while the second axis is a rotation axis of the tool, wherein, in each of target-shape data relating to a target shape of teeth of the gear workpiece and tool-shape data relating to a shape of the tool, both of which are stored in the gear manufacturing apparatus, a cross section of each of one or more teeth of the tool cut along a plane orthogonal to the X-axis direction at a position at which at least one of the teeth of the gear workpiece is included is defined as an X-axis-orthogonal cross section, wherein a direction orthogonal to a tooth trace direction in the X-axis-orthogonal cross section is defined as a thickness direction, wherein each of the one or more teeth of the tool is shaped in the X-axis-orthogonal cross section such that a length of each of the one or more teeth in the thickness direction decreases from a central portion thereof in the tooth trace direction toward opposite ends thereof in the tooth trace direction, wherein a direction orthogonal to a straight line parallel to the first axis in the X-axis orthogonal cross section is defined as a Z-axis direction, wherein, in the X-axis-orthogonal cross section, an intersection between an imaginary straight line and an outer edge line of the tool is defined as a normal machining point, the imaginary straight line passing a center point of the central portion in the thickness direction and parallel to the Z-axis direction, wherein a computational position at which the tool performs machining of the gear workpiece is defined as a machining reference position, wherein each of the teeth of the gear workpiece has opposite end portions in the tooth trace direction, each of the opposite end portions being defined as an end region, and wherein the gear manufacturing method comprises a specific machining step in which, when at least one of the end regions is machined, the gear manufacturing apparatus adjusts a relative position of the tool to the gear workpiece based on information about the relative position computed by setting, as the machining reference position, a position of the tool on the outer edge line in the X-axis-orthogonal cross section different from the normal machining point such that a distance between a center of the tool and a center of the gear workpiece in the X-axis-orthogonal cross section when at least one of the end regions is machined is larger as compared with a case in which the at least one of the end regions is machined by setting the normal machining point as the machining reference position.

For instance, a conventional apparatus is configured to grasp the center of a tooth of the tool as the position of the tooth of the tool and to control the position of the tool based on the tool-shape data and the target shape of the gear workpiece. This machining control provides results substantially similar to those obtained when machining is performed by setting the normal machining point as the machining reference position. In other words, in the conventional apparatus, the normal machining point is set as the machining reference position to perform machining.

The gear manufacturing apparatus according to the present disclosure executes the specific machining control described above. Thus, the center-to-center distance between the gear workpiece and the tool is larger as compared with when machining is performed by setting the normal machining point as the machining reference position, resulting in a reduced depth of bite of the tool at the end region. This obviates excess machining at the end region and enables a relief amount appropriate to the target shape of the gear workpiece in formation of the end relief. In other words, the gear manufacturing apparatus according to the present disclosure ensures enhanced machining accuracy when machining the end region, resulting in accurate formation of the end relief on the tooth. Further, with this configuration, the tool need not be changed to the small-diameter one, and a single large-diameter tool is sufficient for machining, thus preventing a reduction in manufacturing efficiency and an increase in manufacturing cost. These advantageous effects are also offered by the gear manufacturing method according to the present disclosure.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Figure 1:
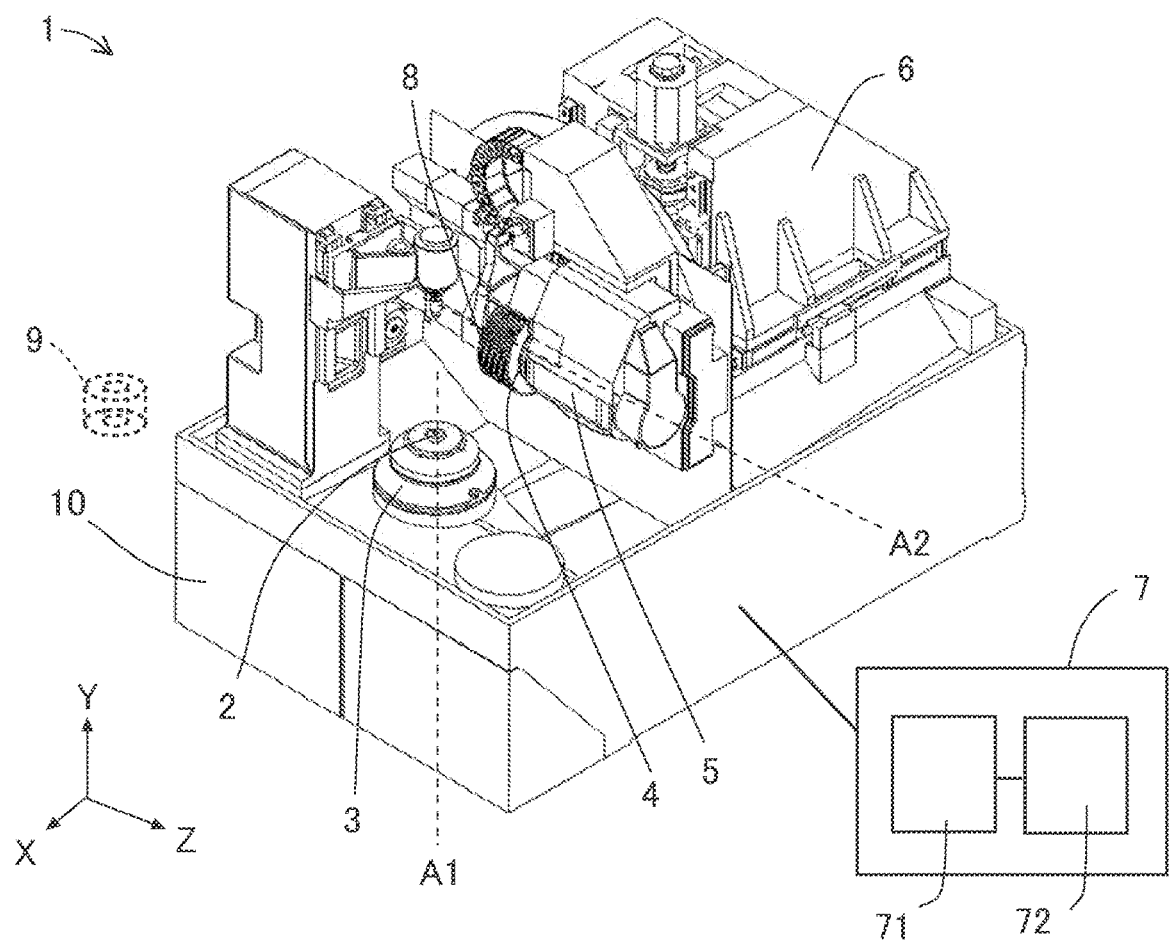
FIG. 1 is a view illustrating a structure of a gear manufacturing apparatus according to one embodiment of the present disclosure in a state in which a gear workpiece is not mounted.

Referring to the drawings, there will be described an embodiment of the present disclosure. As illustrated in FIG. 1, a gear manufacturing apparatus 1 according to the present embodiment includes a first spindle 2, a first holding table 3, a second spindle 4, a second holding table 5, a drive device 6, a control device 7, and a grinding tool 8. The gear manufacturing apparatus 1 is configured to machine teeth of a gear workpiece 9 over en entire circumference thereof with the grinding tool 8 in a state in which the gear workpiece 9 and the grinding tool 8 are rotated in mesh with each other. The gear manufacturing apparatus 1 also includes a dresser or the like. FIG. 1 illustrates the gear manufacturing apparatus 1 in a state in which the gear workpiece 9 is not mounted thereon.

The first spindle 2 is a spindle member configured to hold the gear workpiece 9 having a plurality of teeth. The gear workpiece 9 according to the present embodiment is a cylindrical gear-like workpiece to be formed into a helical gear (involute gear) by grinding. That is, the gear workpiece 9 according to the present embodiment includes a plurality of teeth formed in advance on its outer circumferential surface by another machining performed separately. The grinding control of the present embodiment is executed in finish machining, for instance.

The first holding table 3 is a spindle table holding the first spindle 2 such that the first spindle 2 is rotatable about a first axis A1, which is the axis of the first spindle 2. The first axis A1 is a rotation axis of the gear workpiece 9. The second spindle 4 is a spindle member configured to hold the grinding tool 8 having screw-like teeth formed on its outer circumferential surface. The grinding tool 8 has a generally cylindrical shape. In the present embodiment, the grinding tool 8 is a multi-thread grinding wheel. The grinding tool 8 may be a single-thread grinding wheel or may be a grinding wheel with ring-like teeth. The grinding tool 8 need not necessarily be a grinding wheel. The second holding table 5 is a spindle table holding the second spindle 4 such that the second spindle 4 is rotatable about a second axis A2, which is the axis of the second spindle 4. The second axis A2 is the rotation axis of the grinding tool 8. The first holding table 3 and the second holding table 5 are disposed on a bed 10 of the gear manufacturing apparatus 1. The second holding table 5 holds the second spindle 4 such that the second spindle 4 is movable on the bed 10.

The drive device 6 is configured to rotate the second spindle 4 about the second axis A2 to move at least one of the first holding table 3 and the second holding table 5. The drive device 6 includes a drive source (not illustrated) such as a plurality of motors. As a part of the drive device 6, a drive source for rotating the first spindle 2 about the first axis A1 is provided on the first holding table 3, for instance. Further, as a part of the drive device 6, a drive source for rotating the second spindle 4 about the second axis A2 is provided on the second holding table 5, for instance. Moreover, as a part of the drive device 6, a drive source for moving the second holding table 5 is provided on the bed 10 or a portion connecting the second holding table 5 and the bed 10, for instance. The drive device 6 of the present embodiment is configured to not only rotate the second spindle 4 about the second axis A2 but also rotate the first spindle 2 about the first axis A1. When grinding is performed, the drive device 6 synchronizes rotation of the first spindle 2 and rotation of the second spindle 4 such that the gear workpiece 9 and the grinding tool 8 are rotated. The drive device 6 is capable of changing an angle of the second spindle 4. In the present embodiment, the drive device 6 moves only the second holding table 5 (the second spindle 4) when a relative position of the grinding tool 8 to the gear workpiece 9 is adjusted. In other words, the first holding table 3 in the present embodiment is fixed to the bed 10.

The control device 7 is an electronic control unit (ECU) including one or more processors 71 and memory, for instance. The control device 7 includes a storage 72 storing target-shape data relating to a target shape of the gear workpiece 9 and tool-shape data relating to a shape of the grinding tool 8. The storage 72 may be internal memory, external memory, or a storage medium. The tool-shape data is three-dimensional shape data, for instance. The tool-shape data is updated in accordance with a time of use of the grinding tool 8, namely, a degree of wear of the grinding tool 8. The control device 7 is communicably connected to the drive device 6. The control device 7 may be disposed integrally with the bed 10 or may be separate from the bed 10.

The control device 7 controls the drive device 6 to adjust the relative position of the grinding tool 8 to the gear workpiece 9. In other words, the control device 7 controls a relative position of the second spindle 4 to the first spindle 2. The control device 7 controls (e.g., performs numerical control for controlling) the position and the angle of the grinding tool 8 (the second spindle 4) based on a grinding program pre-stored in the storage 72 and/or a user's operation. Further, the control device 7 controls a rotational speed of each of the first spindle 2 and the second spindle 4.

Coordinate axes (X-axis, Y-axis, and Z-axis) are defined as follows. The axis parallel to the first axis A1 is defined as a Y axis. The axis orthogonal to the Y axis and parallel to the horizontal component of the second axis A2 is defined as a Z axis. The axis orthogonal to the Y axis and the Z axis is defined as an X axis. In a case where the second axis A2 is parallel to the horizontal plane, the second axis A2 and the Z axis are parallel to each other. For instance, the gear manufacturing apparatus 1 is disposed such that the Y-axis direction corresponds to the vertical direction (the up-down direction), the X-axis direction corresponds to the front-rear direction (or the right-left direction), and the Z axis direction corresponds to the right-left direction (or the front-rear direction). The X-axis direction may be referred to as a direction in which the gear workpiece 9 and the grinding tool 8 move toward and away from each other. The X-axis direction is a direction orthogonal to an imaginary plane that includes the second axis A2 and that is parallel to the first axis A1.

Figure 2:
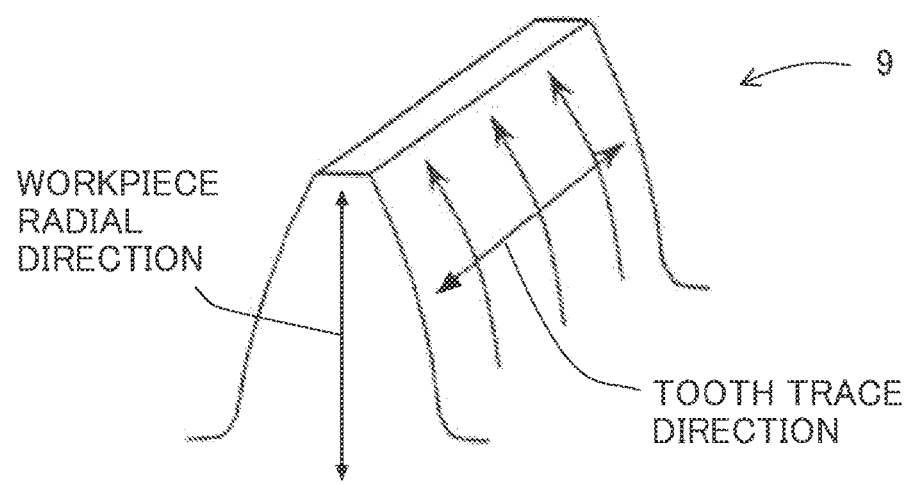
FIG. 2 is a conceptual view for explaining a definition of directions in each tooth of the gear workpiece.

In the following description, the radial direction of the gear workpiece 9 is referred to as "workpiece radial direction", as illustrated in FIG. 2. In a case where the gear workpiece 9 is a workpiece in the form of a spur gear, the tooth trace direction is parallel to the axial direction of the gear workpiece 9. In a case where the gear workpiece 9 is a workpiece in the form of a helical gear as in the present embodiment, the tooth trace direction is inclined with respect to the axial direction (the first axis A1) of the gear workpiece 9. The tooth trace direction may be referred to as a direction of extension of a tooth that extends from one of opposite ends of the gear workpiece 9 in the axial direction to the other. The teeth of the gear workpiece 9 protrude from a base portion (annular portion) thereof in the radial direction while being spaced apart from each other.

Figure 3:
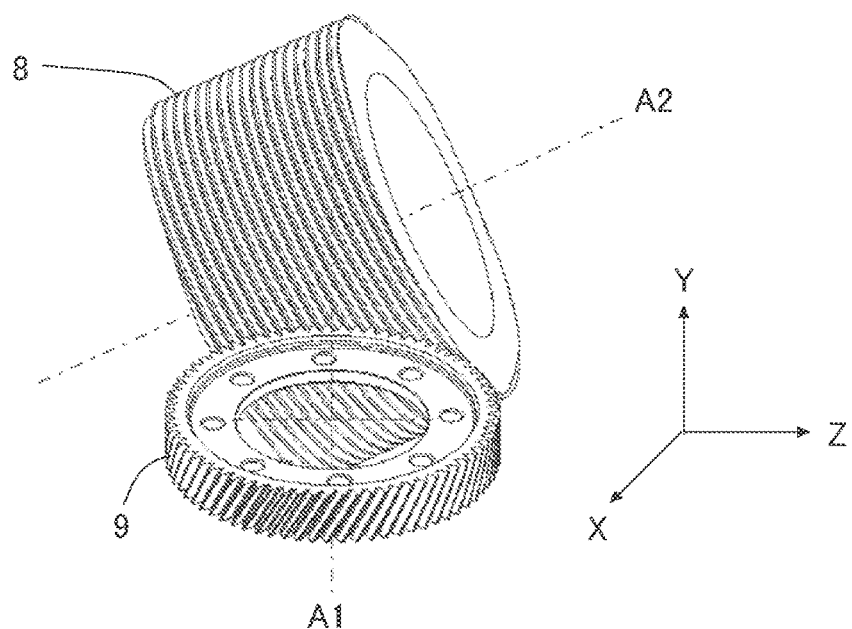
FIG. 3 is a conceptual view for explaining a positional relationship between the gear workpiece and a grinding tool in grinding according to the present embodiment.
Figure 7:
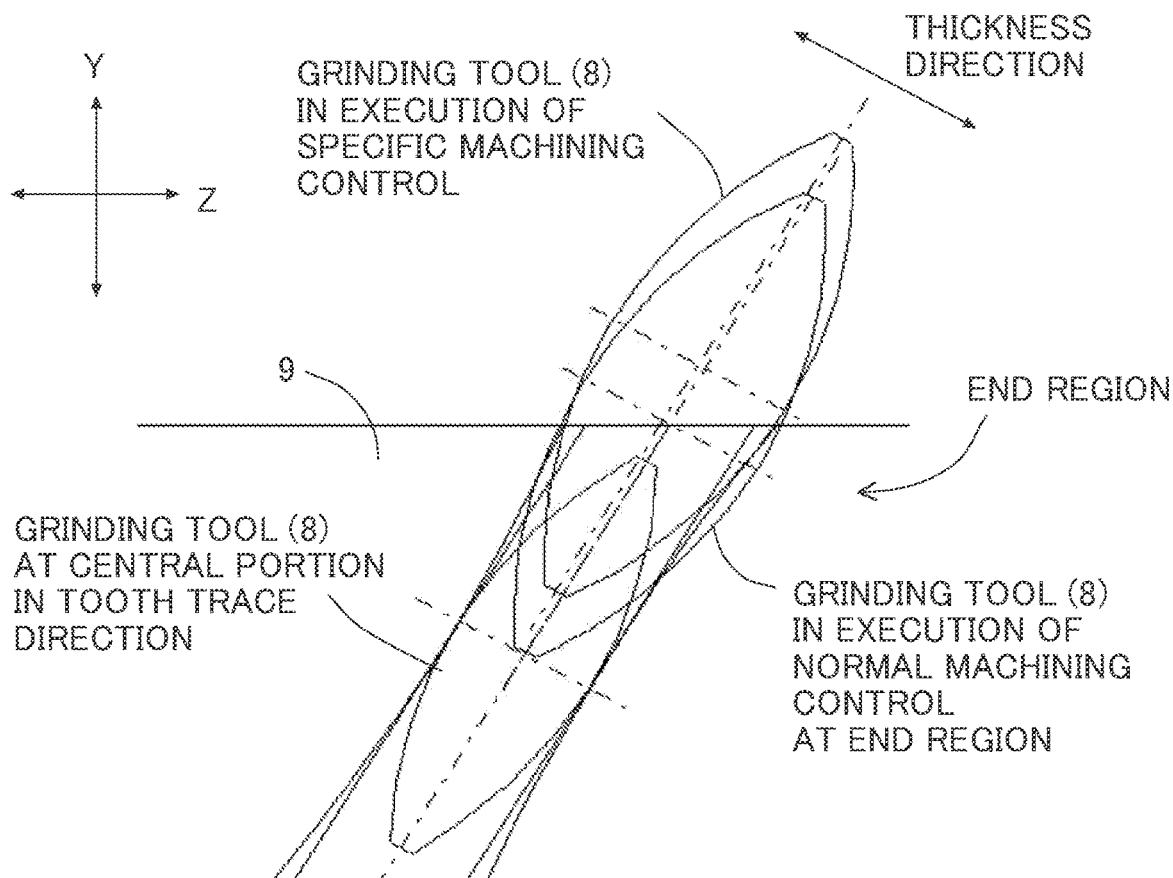
FIG. 7 is a conceptual view corresponding to the cross section (X-axis-orthogonal cross section) in FIG. 5.

As illustrated in FIG. 3, when the gear workpiece 9 in the form of a helical gear is ground with the grinding tool 8 having screw-like teeth, the second spindle 4 and the second holding table 5 are kept in a state in which the second axis A2 is inclined with respect to the Z axis. In the state in which the second spindle 4 is kept inclined, there are executed a normal machining control and a specific machining control that will be later described. In grinding according to the present embodiment, the first axis A1 and the second axis A2 are not orthogonal to each other. In a state in which the gear workpiece 9 is held by the first spindle 2, the rotation axis (the first axis A1) of the gear workpiece 9 extends in the Y-axis direction and the teeth of the gear workpiece 9 extend in a direction inclined with respect to the Y axis, i.e., the tooth trace direction. Before grinding, the grinding tool 8 and the gear workpiece 9 are spaced apart from each other in the X axis direction. In each of the teeth of the gear workpiece 9, opposite end portions in the tooth trace direction, at each of which an end relief is formed, will be referred to as "end regions" (FIG. 7).

Normal Machining Control And Specific Machining Control

The control device 7 is configured to execute a normal machining control for machining a portion of the tooth of the gear workpiece 9 other than the end regions and a specific machining control for machining the end regions of the tooth of the gear workpiece 9. That is, when machining the tooth of the gear workpiece 9, the gear manufacturing apparatus 1 machines the vicinity of the central portion of the tooth in the tooth trace direction by the normal machining control and machines the end regions of the tooth by the specific machining control. In the present embodiment, the specific machining control is executed for portions of the tooth where higher machining accuracy is demanded, namely, the specific machining control is executed for the end regions on each of which the end relief is formed.

Figure 4:
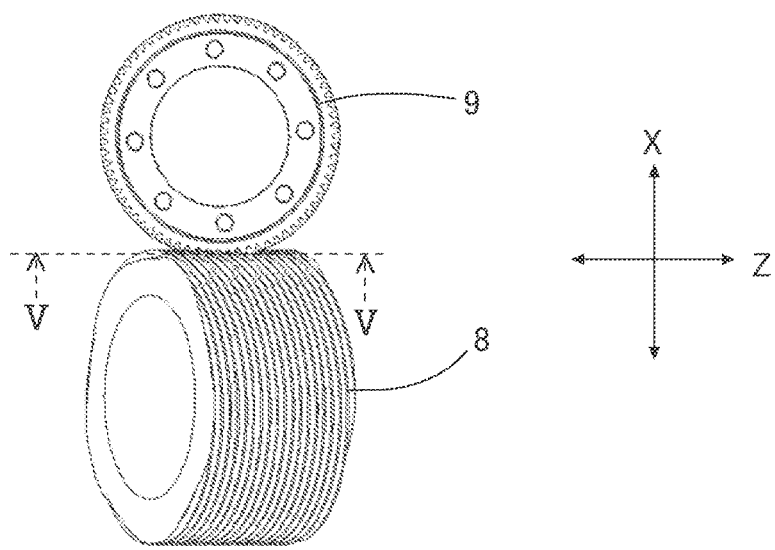
FIG. 4 is a conceptual view illustrating a state of meshing of the gear workpiece and the grinding tool.
Figure 5:
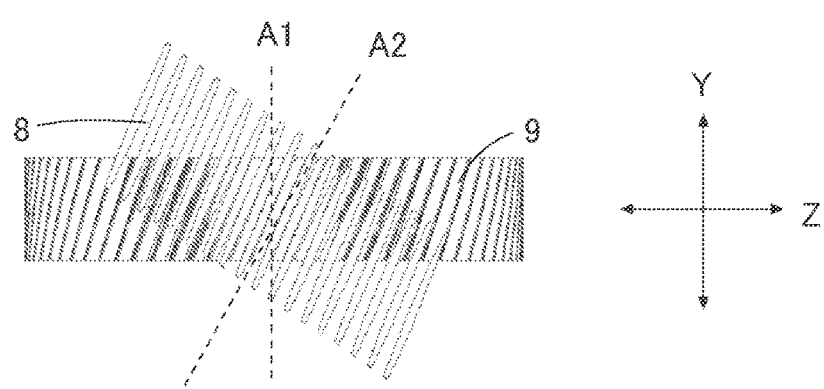
FIG. 5 is a conceptual view illustrating a cross section taken along line V-V in FIG. 4.

There will be described a computing method for computing a machining locus of the grinding tool 8, namely, for computing time-series data of coordinate information. In a state in which the gear workpiece 9 and the grinding tool 8 are in mesh with each other as illustrated in FIGS. 4 and 5, a cross section of each of the teeth of the grinding tool 8 cut along a predetermined or certain plane orthogonal to the X-axis direction at a position at which at least one of the teeth of the gear workpiece 9 is included will be referred to as "X-axis-orthogonal cross section". The X-axis-orthogonal cross section is a basic view in computation. More than one X-axis-orthogonal cross section may be set. The X-axis-orthogonal cross section may be referred to as a YZ plane, which is a plane including a straight line parallel to the Y-axis and a straight line parallel to the Z-axis. The Z-axis direction may be referred to as a direction in the X-axis-orthogonal cross section that is orthogonal to a straight line parallel to the first axis A1.

Figure 6:
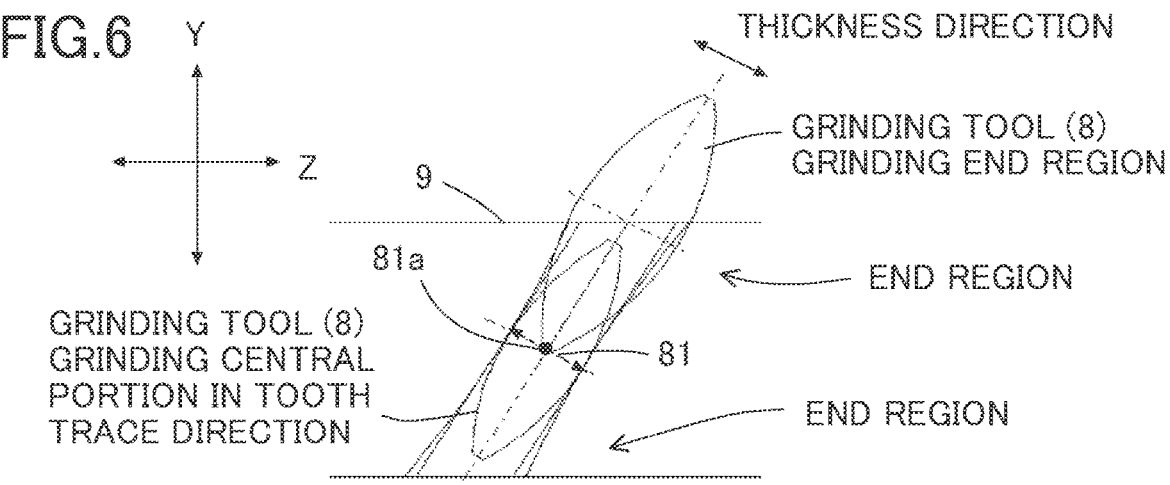
FIG. 6 is a conceptual view corresponding to the cross section (X-axis-orthogonal cross section) in FIG. 5.
Figure 8:
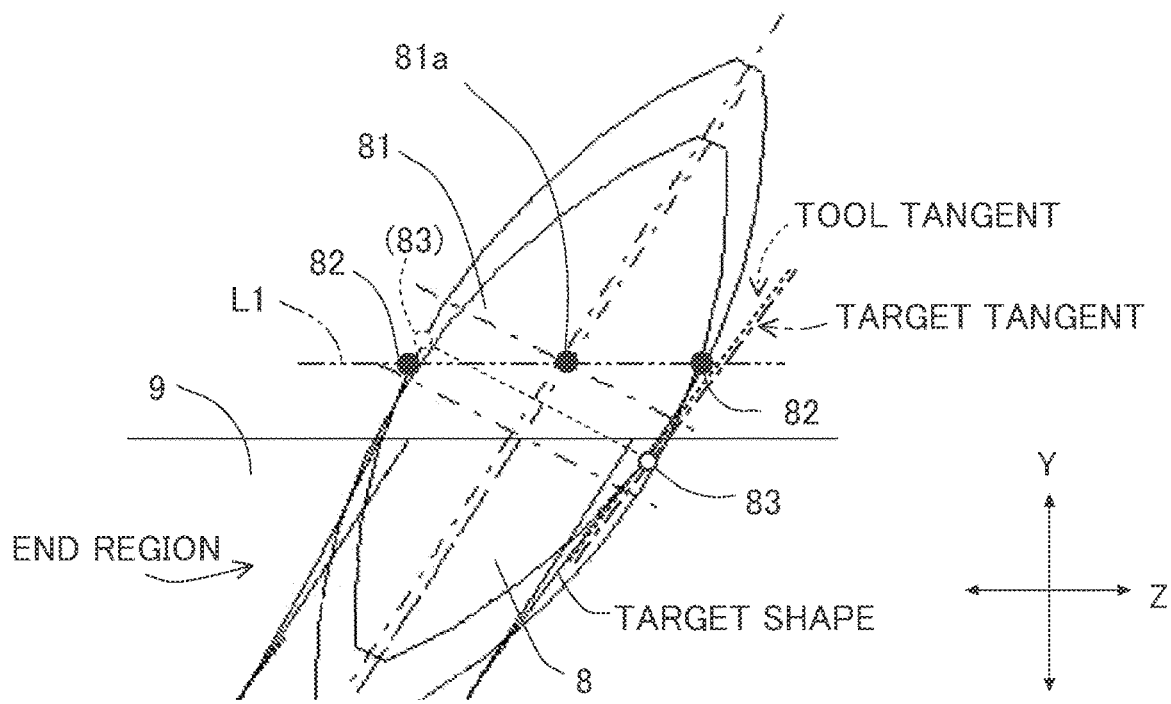
FIG. 8 is a conceptual view corresponding to the cross-section (X-axis-orthogonal cross section) in FIG. 5.

As illustrated in FIG. 6, a direction in the X-axis-orthogonal cross section that is orthogonal to the tooth trace direction will be referred to as "thickness direction" of the tooth of the tool 8. The tooth of the grinding tool 8 is shaped in the X-axis-orthogonal cross section such that a length of the tooth in the thickness direction decreases from a central portion 81 in the tooth trace direction toward opposite ends in the tooth trace direction. That is, the tooth of the grinding tool 8 has a cigar-like shape in the X-axis-orthogonal cross section, for instance. As illustrated in FIG. 8, in the X-axis-orthogonal cross section, an intersection between: an imaginary straight line L1 passing a center point 81a in the thickness direction of the central portion 81 and parallel to the Z-axis direction; and an outer edge line of the grinding tool 8 is defined as a normal machining point 82. Each tooth of the grinding tool 8 has a maximum length in the thickness direction at a longitudinally middle portion of the tooth of the grinding tool 8.

In a conventional apparatus, the machining locus of the tool is set based on the target shape of the gear workpiece 9 (including the target shape of the teeth), an interval between any adjacent teeth in the target shape, the shape of the tool, and the center point of the tool. In the conventional apparatus, the machining locus of the tool is set on the assumption that the normal machining point 82 is substantially a point of contact of the grinding tool 8 with the gear workpiece 9, namely, a point at which the grinding tool 8 machines the gear workpiece 9. In the normal machining control of the present embodiment, the machining locus is set so as to similar to the machining locus set in the conventional apparatus. The normal machining control is a control for performing machining, namely, a control for adjusting the position of the center point 81a, according to the machining locus set based on the center point 81a of the grinding tool 8 and the shape of the grinding tool 8. The normal machining control is substantially a control for performing machining by setting the normal machining point 82 as a machining reference position. The machining reference position is a position on the grinding tool 8 in the X-axis-orthogonal cross section at which it is assumed or set in computation that the grinding tool 8 machines the gear workpiece 9.

The control device 7 recognizes the machining reference position as a position at which the grinding tool 8 comes into contact with the gear workpiece 9, namely, a position at which the grinding tool 8 grinds the gear workpiece 9. The control device 7 sets the machining reference position based on the tool-shape data and computes the machining locus of the grinding tool 8 based on the target-shape data and the machining reference position.

Each of FIGS. 6, 7, and 8 is a schematic view of the X-axis-orthogonal cross section at the meshing position of the teeth of the gear workpiece 9 and the teeth of the grinding tool 8. The area of the tooth of the grinding tool 8 in the X-axis-orthogonal cross section increases in the radically inward direction of the grinding tool 8, namely, toward the bottom portion of the tooth of the grinding tool 8.

FIG. 6 illustrates a position and a size of the grinding tool 8 in the X-axis-orthogonal cross section when forming a crowning on the tooth surface of the gear workpiece 9. The position of the grinding tool 8 when machining the end region shifts toward the gear workpiece 9 in the X-axis direction, as compared with the position of the grinding tool 8 when machining the central portion in the tooth trace direction. With this configuration, the cross-sectional area of the grinding tool 8 in the X-axis-orthogonal cross section when machining the end region is larger than that when machining the central portion in the tooth trace direction. That is, as the grinding tool 8 moves from the central portion in the tooth trace direction toward the end region, the length of the tooth of the grinding tool 8 in the thickness direction increases and the machining reference position shifts in a direction in which the machining tool 8 bites into the gear workpiece 9. Thus, each of the teeth of the gear workpiece 9 has a reduced thickness at its opposite end portions in tooth trace direction, so that the crowning is formed.

In a case where the crowning or the end relief (the large end relief, in particular) is formed at the end region, the control device 7 executes the specific machining control when machining the end region. In the specific machining control, the machining reference position is set to a position different from that in the normal machining control. In the specific machining control, the machining reference position is set as follows.

For instance, the control device 7 divides the target-shape data, i.e., the target shape of the tooth of the gear workpiece 9, into a plurality of areas. The control device 7 performs the following computation on some areas among the plurality of areas that correspond to the end region. (Hereinafter, these areas will be referred to as "specific areas" where appropriate.) The control device 7 selects one of the plurality of specific areas. The control device 7 selects, in the selected specific area, a point on an outer edge line of the target shape of the tooth, e.g., a point located at the central portion of the selected specific area. The control device 7 computes a function representing a tangent at the point selected in the selected specific area (hereinafter referred to as "target point" where appropriate). The control device 7, or specifically the storage 72 stores the function representing the tangent at the target point (hereinafter referred to as "target tangent" where appropriate).

Here, a function representing a tangent to the tooth of the grinding tool 8 is defined as "tool tangent". The control device 7 computes, based on the shape data of the grinding tool 8, a position of the tooth of the grinding tool 8 where the tool tangent and the target tangent coincide with each other when the grinding tool 8 reaches the target point. (Hereinafter, this position will be referred to as "specific position" where appropriate.) In computation, the tool tangent that coincides with the target tangent is detected by changing the position of the grinding tool 8 in the basic view. The control device 7 computes the specific position based on the target tangent and the tool-shape data. Alternatively, the specific position may be detected in the following manner. The control device 7 may store a plurality of X-axis-orthogonal cross sections cut at positions of the tooth of the grinding tool 8 mutually different in the X-axis direction and may check each of the plurality of X-axis-orthogonal cross sections, so as to detect the specific position where the tool tangent coincides with the target tangent. The function representing the tangent at the target point may be replaced with a differential value (gradient) of the outer edge line of the target shape of the tooth of the gear workpiece 9. The function representing the tangent to the tooth of the grinding tool 8 may be replaced with a differential value (gradient) of the outer edge line of the tooth of the grinding tool 8. In this case, a position on the outer edge line of the grinding tool 8, at which the gradient of the tangent to the tooth of the grinding tool 8 coincides with the gradient of the tangent at the target point, is the specific position.

The control device 7 sets the thus detected specific position of the grinding tool 8 as the machining reference position in machining the selected specific area. Based on the target-shape data, the control device 7 computes the machining locus such that a portion of the gear workpiece 9 corresponding to the selected specific area is ground by a portion of the grinding tool 8 corresponding to the specific position. The control device 7 performs the computation on other specific areas, so as to execute the specific machining control for the entirety of the end region. In this respect, the specific position may be set for one of opposite surfaces of the tooth of the grinding tool 8 in the thickness direction and need not be set for the other of the opposite surfaces, as later described.

A case is considered in which, when the end region is machined, the machining locus is computed by setting the normal machining point 82 of the grinding tool 8 as the machining reference position as in the conventional machining method. In this case, as illustrated in FIG. 7, the position of the grinding tool 8 according to the thus computed machining locus is nearer to the central portion of the tooth of the gear workpiece 9 in the tooth trace direction, as compared with the position of the grinding tool 8 according to the machining locus computed in the specific machining control. This leads to an increase in an unintended grinding amount with an increase in the relief amount of the end relief, thus causing a large deviation of the actual shape from the target shape. The deviation is unignorably large in a case where the large end relief is formed by only the conventional method, e.g., by only the normal machining control.

When the specific machining control is executed for the end region, on the other hand, the machining reference position corresponds to the specific position 83, and the position of the grinding tool 8 shifts toward the one end in the tooth trace direction, as compared with when the normal machining control is executed for the end region, as illustrated in FIGS. 7 and 8. This obviates an excess grinding amount, resulting in formation of the tooth surface shape conforming to the target shape. Since the target tangent and the tool tangent are consistent with each other, the grinding tool 8 is prevented from grinding the tooth of the gear workpiece 9 inside the target shape, namely, inside the outer edge line of the target shape, at a position other than the machining reference position. That is, the tooth of the gear workpiece 9 is prevented from being ground deeply into the target shape, so that the tooth surface shape approximate to the target shape is obtained.

Figure 9:
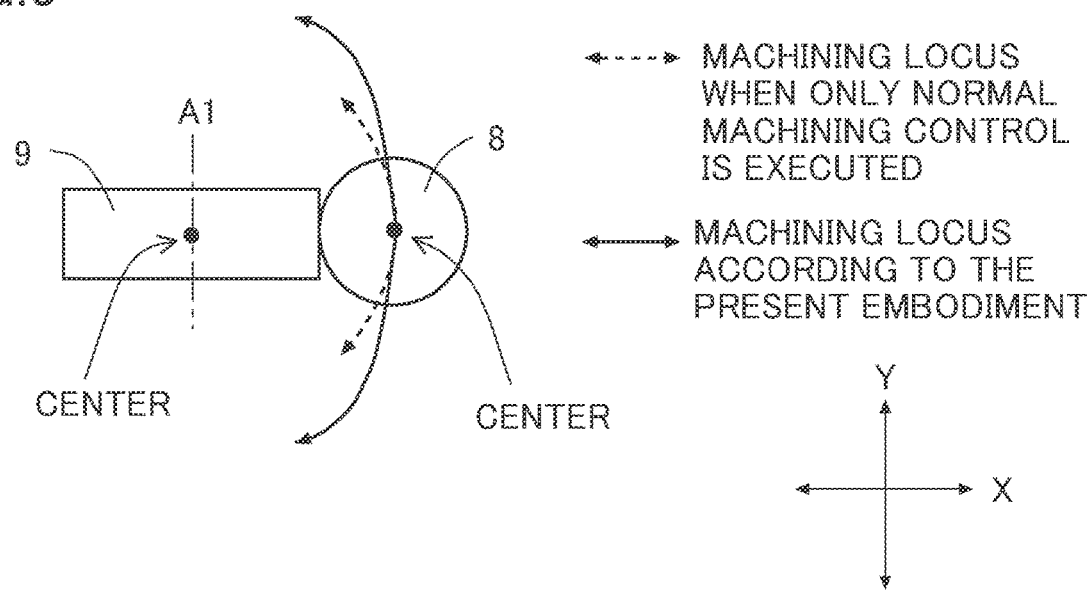
FIG. 9 is a conceptual view for explaining machining loci of the grinding tool.

As illustrated in FIG. 9, when the tooth surface having the end relief is formed, the locus of the center of the grinding tool 8 on the XY plane in the present embodiment passes farther from the center of the gear workpiece 9 than the locus when machining is performed by only the normal machining control, in other words, the locus draws a big arc. That is, the machining reference position is set in the specific machining control such that a distance between the center of the grinding tool 8 and the center of the gear workpiece 9 is larger than that set in the normal machining control in which the normal machining point 82 is set as the machining reference position. In the position control of the present embodiment, the position of the grinding tool 8 is controlled in only the X-axis direction and the Y-axis direction. It is, however, noted that the position of the grinding tool 8 may be simultaneously controlled also in the Z-axis direction, in addition to the X-axis direction and the Y-axis direction.

Execution of the specific machining control causes the locus of the center of the grinding tool 8 to be curved at a curvature smaller than a curvature of the locus in the normal machining control. In other words, the specific machining control enables a change in the position of the grinding tool 8 in the X-axis direction to be gentle, namely, the specific machining control enables the depth of bite of the tool to be small. In other words, according to the specific machining control of the present embodiment, the curved (arcuate) locus of the center of the grinding tool 8 on the XY plane expands, as compared with when machining is performed by only the normal machining control. Further, a position in the X-axis direction of each end of the machining locus (each end in the Y-axis direction) in the specific machining control is located nearer to the gear workpiece 9 than that in the normal machining control. By thus setting the machining locus, the tooth of the gear workpiece 9 is prevented from being ground deeply into the target shape, so that the tooth surface shape approximate to the target shape is obtained.

As one example of computation, the control device 7 mathematizes the tooth surface shape (tooth trace shape) of the gear workpiece 9 determined based on the user's operation. The control device 7 calculates a tangent at a certain position of the tooth surface shape. The control device 7 mathematizes a cross sectional shape of the grinding tool 8 determined based on the user's operation. The control device 7 calculates an outer edge position (the specific position 83) of the grinding tool 8 where the tangent to the tooth surface of the gear workpiece 9 and the tangent to the tooth of the grinding tool 8 coincide with each other and calculates coordinates for machining. The outer edge position is a point on the outer edge line of the tooth of the grinding tool 8 in the X-axis-orthogonal cross section.

In a case where the target shape is the same for opposite surfaces of the tooth of the gear workpiece 9 in the thickness direction, the machining reference position may be set for each of opposite surfaces of the tooth of the grinding tool 8 in the specific machining control. As illustrated in FIG. 8, an intersection between: a straight line passing the specific position 83 on one of the opposite tooth surfaces and extending in the thickness direction; and the other of the opposite tooth surfaces may be set as the machining reference position. In this case, the target tangent and the tool tangent may coincide with each other only on the one tooth surface. However, the machining error on the other tooth surface is small in this case, and the influence on the machining accuracy is accordingly small. In a case where the machining reference positions are set for the opposite tooth surfaces of the tool 8 as described above, the machining reference positions may be set based on the one tooth surface as a reference. Alternatively, the point where the target tangent and the tool tangent coincide with each other may be detected for each of the both tooth surfaces, and a position between the two points, namely, a middle position between the two points in the tooth trace direction, may be set as the machining reference position. In a case where the target shape largely differs between the opposite surfaces of the tooth of the gear workpiece 9, the machining reference position may be set for each tooth surface, for instance, and machining is performed on the opposite surfaces separately.

For forming each tooth of the gear workpiece 9 into the target shape, the control device 7 according to the present embodiment executes the specific machining control when machining the end regions of the tooth of the gear workpiece 9 that are opposite end portions of the tooth in the tooth trace direction and executes the normal machining control when machining a portion of the tooth other than the end regions. In the normal machining control, the control device 7 adjusts the position of the grinding tool 8 based on the center point 81a of the grinding tool 8 and the tool-shape data by substantially setting the normal machining point 82 as the machining reference position. In the specific machining control, the control device 7 adjusts the relative position of the grinding tool 8 to the gear workpiece 9 by setting, as the machining reference position, a position in the tooth of the grinding tool 8 in the X-axis-orthogonal cross section different from the normal machining point 82 such that the distance between the center of the grinding tool 8 and the center of the gear workpiece 9 is larger than that when the end regions are machined according to the normal machining control.

The control device 7 may execute the specific machining control on a portion of the tooth of the gear workpiece 9 other than the end regions. In other words, the control device 7 is configured to execute the specific machining control for at least one of the end regions. For instance, the control device 7 may execute the specific machining control for the entirety of the tooth in the tooth trace direction. For instance, the control device 7 may calculate, for the portion other than the end regions, the specific position where the target tangent and the tool tangent coincide with each other and may calculate the machining locus by setting the specific position as the machining reference position. When at least one of the end regions is machined, the control device 7 sets, as the machining reference position, the position of the grinding tool 8 on the outer edge line in the X-axis-orthogonal cross section, which position is different from the normal machining point 82, so as to adjust the position of the grinding tool 8. The outer edge line may be referred to as an outline.

The control device 7 adjusts the position of the grinding tool 8 based on the machining locus (information on the relative position) set by executing a first computing processing, a second computing processing, and a position setting processing in the specific machining control. The first computing processing is for setting the target point on the outer edge line of the target machining portion (such as the selected specific area) in the target shape of the gear workpiece 9 in the X-axis-orthogonal cross section and computing the target tangent that is the tangent to the target shape at the target point. The second computing processing is for computing the specific position 83 that is the position on the outer edge line of the grinding tool 8 at which the tangent to the grinding tool 8, i.e., the tool tangent, coincides with the target tangent in the X-axis-orthogonal cross section. The position setting processing is for setting the relative position of the grinding tool 8 to the gear workpiece 9 such that the target point and the specific position coincide with each other after machining of the target machining portion. The position setting processing may be referred to as a processing for computing and setting the machining locus. In a case where each processing is executed by other computers, the computers may be part of the control device 7.

By setting, as the machining reference position, the specific position 83 on the outer edge line of the grinding tool 8 where the target tangent and the tool tangent coincide with each other, the grinding tool 8 is prevented from performing machining at a position other than the machining reference position, resulting in accurate formation of the tooth surface approximate to the target shape. Even if a position in the grinding tool 8 where the target shape and the tool tangent do not coincide with each other is set as the machining reference position, an excess relief amount is obviated by setting the machining reference position to a position that deviates from the normal machining point 82 such that the distance between the center of the grinding tool 8 and the center of the gear workpiece 9 in the end region in the X-axis-orthogonal cross section is larger, namely, the depth of the bite of the tool is smaller. As illustrated in FIG. 9, on the XY plane (cross section), the center of the grinding tool 8 is located on the second axis A2 while the center of the gear workpiece 9 is located on the first axis A1.

The gear manufacturing method according to the present embodiment is a method using the gear manufacturing apparatus configured to machine the gear workpiece 9 over an entire circumference thereof in a state in which the gear workpiece 9 and the grinding tool 8 are rotated in mesh with each other. The method includes a specific machining step corresponding to the specific machining control. In the specific machining step, when at least one of the end regions is machined, the relative position of the grinding tool 8 to the gear workpiece 9 is adjusted by setting, as the machining reference position, the position of the grinding tool 8 on the outer edge line in the X-axis-orthogonal cross section that is different from the normal machining point 82 such that the distance between the center of the grinding tool 8 and the center of the gear workpiece 9 in the X-axis-orthogonal cross section when the at least one of the end regions is machined is larger as compared with a case in which the at least one of the end regions is machined by setting the normal machining point 82 as the machining reference position.

Advantageous Effects

The conventional apparatus is configured to grasp the center of the tooth of the tool as the position of the tooth of the tool and to set the position of the tool, i.e., the machining locus, based on the tool-shape data and the target shape of the gear workpiece. This machining control provides results substantially similar to those obtained when the normal machining point 82 is set as the machining reference position. In other words, in the conventional apparatus, the normal machining point 82 is set as the machining reference position to perform machining, as in the normal machining control.

In the gear manufacturing apparatus 1 according to the present embodiment, the specific machining control is executed. Thus, the center-to-center distance between the gear workpiece 9 and the grinding tool 8 is larger as compared with when machining is performed by setting the normal machining point 82 as the machining reference position, thus resulting in a decrease in the depth of bite (the depth of cut) of the tool at the end region. This obviates excess machining at the end region and enables the relief amount appropriate to the target shape of the gear workpiece in formation of the end relief. In other words, the gear manufacturing apparatus according to the present embodiment ensures enhanced machining accuracy when machining the end region, so that the end relief can be accurately formed on the tooth. Further, with this configuration, the tool need not be changed to the small-diameter one, and a single large-diameter tool is sufficient for machining, thus preventing a reduction in manufacturing efficiency and an increase in manufacturing cost. The gear manufacturing apparatus according to the present embodiment enables formation of the end relief approximate to the target shape, resulting in reduced gear noise, namely, enhanced quietness of the gear when operating.

The gear workpiece 9 is machined such that the target tangent and the tool tangent coincide with each other, so that the end relief and the like can be formed with high accuracy. These advantageous effects are also offered by the gear manufacturing method according to the present embodiment that includes the specific machining step. In this respect, the specific machining control, i.e., the specific machining step, is applicable to machining of the crowning.

Modifications

It is to be understood that the present disclosure is not limited to the details of the illustrated embodiment. For instance, the gear workpiece 9 is not limited to the workpiece in the form of the helical gear but may be a workpiece in the form of a spur gear. The tool to which the present disclosure is applied is not limited to the grinding tool having screw-like or ring-like teeth but may be a cutting tool having screw-like teeth (such as a hob cutter) or a cutting tool having ring-like teeth. In other words, the specific machining control is applicable to cutting or the like. For instance, the present disclosure is applicable to gear cutting for cutting a cylindrical gear workpiece 9 in which teeth are not formed. In this instance, machining is performed by rotating the gear workpiece 9 and the cutting tool not in mesh with each other but in contact with each other. In this instance, it may be considered that the control device 7 adjusts the relative position of the gear workpiece 9 and the cutting tool such that the teeth of the target shape of the gear workpiece 9 and the teeth of the cutting tool mesh with each other. Also in gear cutting, the machining reference position may be set to a position different from the normal machining point 82 to execute the specific machining control. Further, the gear manufacturing apparatus 1 can operate such that the target tangent based on the target shape of the tooth of the gear workpiece 9, i.e., the target shape in cutting, and the tool tangent to the tooth of the cutting tool coincide with each other. In the following description, a tool for grinding or cutting will be referred to as "tool 8".

As described above, the gear manufacturing apparatus 1 according to the present disclosure is configured to machine the gear workpiece 9 over an entire circumference thereof in a state in which the gear workpiece 9 and the tool 8 for grinding or cutting are in contact with each other and are rotated. The control device 7 includes the storage 72 storing the target-shape data relating to the target shape of the teeth of the gear workpiece 9 and the tool-shape data relating to the shape of the tool 8. The direction orthogonal to the imaginary plane that includes the second axis A2 and that is parallel to the first axis A1 is defined as the X-axis direction. The computational position at which the tool 8 performs machining of the gear workpiece 9 is defined as the machining reference position. In each of the target-shape data and the tool-shape data, the cross section of each teeth of the tool 8 cut along the plane orthogonal to the X-axis direction at the position at which at least one of the teeth of the gear workpiece 9 is included is defined as the X-axis-orthogonal cross section. The direction orthogonal to the tooth trace direction in the X-axis-orthogonal cross section is defined as the thickness direction. The direction orthogonal to the straight line parallel to the first axis A1 in the X-axis-orthogonal cross section is defined as the Z-axis direction. The intersection between the imaginary straight line and the outer edge line of the tool 8 in the X-axis-orthogonal cross section is defined as the normal machining point 82. The imaginary straight line passes the center point 81a of the central portion 81 in the thickness direction and is parallel to the Z-axis direction. The computational position at which the tool 8 performs machining of the gear workpiece 9 is defined as the machining reference position. Each tooth of the gear workpiece 9 has opposite end portions in the tooth trace direction, each of which is defined as the end region. When at least one of the end regions is machined, the control device 7 executes the specific machining control for adjusting the relative position of the tool 8 based on information about the relative position of the tool 8 computed by setting, as the machining reference position, the position of the tool 8 on the outer edge line in the X-axis-orthogonal cross section different from the normal machining point 82 such that the distance between the center of the tool 8 and the center of the gear workpiece 9 when the at least one of the end regions is machined is larger as compared with a case in which the at least one of the end regions is machined by setting the normal machining point 82 as the machining reference position.

In the specific machining control, the control device 7 may set the specific position obtained in advance by computation as the machining reference position. The present disclosure is applicable to not only the configuration in which the specific position is computed when machining is actually performed but also to a configuration in which machining is performed based on the machining locus (such as a numerical control program) set based on the specific position computed in advance. For instance, the specific position 83 where the target tangent and the tool tangent coincide with each other may be computed in advance, and the control device 7 may store such a specific position 83 in the storage 72 to execute the specific machining control. The specific machining control according to the present disclosure includes machining control in which machining is performed based on the machining locus computed in advance by setting the position different from the normal machining point 82 (such as the specific position 83) as the machining reference position. The gear manufacturing apparatus and the gear manufacturing method according to the present disclosure enable the machining locus of the tool 8 to draw a larger arc as compared with the machining locus of the conventional method, so as to achieve the gear shape more approximate to the target shape than the gear shape obtained by the conventional method.

The gear manufacturing apparatus 1 may form the end relief(s) on each tooth after the crowning is formed. In this instance, the control device 7 may machine the entirety of the gear workpiece 9 by the normal machining control to form the crowning on each tooth and may form the end relief(s) at the end regions by the specific machining control after the crowning is formed.

The drive device 6 may be configured to move the first holding table 3. The drive device 6 may be configured to move both the first holding table 3 and the second holding table 5. In the illustrated embodiment, when machining is performed, the first spindle 2 (the gear workpiece 9) is rotated by the drive force of the drive device 6. Instead of applying the drive force to the first spindle 2 by the drive device 6, the first spindle 2 may be kept in a state in which the first spindle 2 is freely rotatable. In this instance, the gear workpiece 9 is rotated not by the drive force of the drive device 6 but by rotation of the grinding tool 8 meshing therewith.

What is claimed is:

1. A gear manufacturing apparatus for machining a gear workpiece over an entire circumference thereof in a state in which the gear workpiece and a tool for grinding or cutting are in contact with each other and are rotated, comprising:
   a first spindle configured to hold the gear workpiece;
   a first holding table holding the first spindle such that the first spindle is rotatable about a first axis that is an axis of the first spindle;
   a second spindle configured to hold the tool including one or more screw-like or ring-like teeth formed on an outer circumferential surface of the tool;
   a second holding table holding the second spindle such that the second spindle is rotatable about a second axis that is an axis of the second spindle;
   a drive device configured to rotate the second spindle about the second axis and to move at least one of the first holding table and the second holding table; and
   a control device configured to control the drive device to adjust a relative position of the tool to the gear workpiece;
   wherein the control device includes a storage storing target-shape data relating to a target shape of teeth of the gear workpiece and tool-shape data relating to a shape of the tool,
   wherein a direction orthogonal to an imaginary plane that includes the second axis and that is parallel to the first axis is defined as an X-axis direction,
   wherein, in each of the target-shape data and the tool-shape data, a cross section of each of the one or more teeth of the tool cut along a plane orthogonal to the X-axis direction at a position at which at least one of the teeth of the gear workpiece is included is defined as an X-axis-orthogonal cross section,
   wherein a direction orthogonal to a tooth trace direction in the X-axis-orthogonal cross section is defined as a thickness direction,
   wherein a direction orthogonal to a straight line parallel to the first axis in the X-axis-orthogonal cross section is referred to as a Z-axis direction,
   wherein each of the one or more teeth of the tool is shaped in the X-axis-orthogonal cross section such that a length of each of the one or more teeth in the thickness direction decreases from a central portion thereof in the tooth trace direction toward opposite ends thereof in the tooth trace direction,
   wherein, in the X-axis-orthogonal cross section, an intersection between an imaginary straight line and an outer edge line of the tool is defined as a normal machining point, the imaginary straight line passing a center point of the central portion in the thickness direction and parallel to the Z-axis direction,
   wherein a computational position at which the tool performs machining of the gear workpiece is defined as a machining reference position,
   wherein each of the teeth of the gear workpiece has opposite end portions in the tooth trace direction, each of the opposite end portions being defined as an end region, and
   wherein, when at least one of the end regions is machined, the control device executes a specific machining control for adjusting the relative position based on information about the relative position computed by setting, as the machining reference position, a position of the tool on the outer edge line in the X-axis-orthogonal cross section different from the normal machining point such that a distance between a center of the tool and a center of the gear workpiece in the X-axis-orthogonal cross section when the at least one of the end regions is machined is larger as compared with a case in which the at least one of the end regions is machined by setting the normal machining point as the machining reference position.

2. The gear manufacturing apparatus according to claim 1, wherein, in the specific machining control, the control device executes:
   a first computing processing in which the control device sets a target point on an outer edge line of a target machining portion in the target shape in the X-axis-orthogonal cross section and computes a target tangent that is a tangent to the target shape at the target point;
   a second computing processing in which the control device computes a specific position that is a position on the outer edge line of the tool at which a tangent to the tool coincides with the target tangent in the X-axis-orthogonal cross section; and
a position setting processing in which the control device sets the relative position such that the target point and the specific position coincide with each other after machining of the target machining portion, and
wherein, in the specific machining control, the control device adjusts the relative position based on the information about the relative position set by executing the first computing processing, the second computing processing, and the position setting processing.

3. A gear manufacturing method using a gear manufacturing apparatus configured to machine a gear workpiece over an entire circumference thereof in a state in which the gear workpiece and a tool are in contact with each other and are rotated,
wherein a direction orthogonal to an imaginary plane that is parallel to a first axis and that includes a second axis is defined as an X-axis direction, the first axis being a rotation axis of the gear workpiece while the second axis is a rotation axis of the tool,
wherein, in each of target-shape data relating to a target shape of teeth of the gear workpiece and tool-shape data relating to a shape of the tool, both of which are stored in the gear manufacturing apparatus, a cross section of each of one or more teeth of the tool cut along a plane orthogonal to the X-axis direction at a position at which at least one of the teeth of the gear workpiece is included is defined as an X-axis-orthogonal cross section,
wherein a direction orthogonal to a tooth trace direction in the X-axis-orthogonal cross section is defined as a thickness direction,
wherein each of the one or more teeth of the tool is shaped in the X-axis-orthogonal cross section such that a length of each of the one or more teeth in the thickness direction decreases from a central portion thereof in the tooth trace direction toward opposite ends thereof in the tooth trace direction,
wherein a direction orthogonal to a straight line parallel to the first axis in the X-axis orthogonal cross section is defined as a Z-axis direction,
wherein, in the X-axis-orthogonal cross section, an intersection between an imaginary straight line and an outer edge line of the tool is defined as a normal machining point, the imaginary straight line passing a center point of the central portion in the thickness direction and parallel to the Z-axis direction,
wherein a computational position at which the tool performs machining of the gear workpiece is defined as a machining reference position,
wherein each of the teeth of the gear workpiece has opposite end portions in the tooth trace direction, each of the opposite end portions being defined as an end region, and
wherein the gear manufacturing method comprises a specific machining step in which, when at least one of the end regions is machined, the gear manufacturing apparatus adjusts a relative position of the tool to the gear workpiece based on information about the relative position computed by setting, as the machining reference position, a position of the tool on the outer edge line in the X-axis-orthogonal cross section different from the normal machining point such that a distance between a center of the tool and a center of the gear workpiece in the X-axis-orthogonal cross section when at least one of the end regions is machined is larger as compared with a case in which the at least one of the end regions is machined by setting the normal machining point as the machining reference position.

4. The gear manufacturing method according to claim 3, wherein, in the specific machining control, the gear manufacturing device adjusts the relative position based on the information about the relative position set by:
a first computing processing of setting a target point on an outer edge line of a target machining portion in the target shape in the X-axis-orthogonal cross section and computing a target tangent that is a tangent to the target shape at the target point;
a second computing processing of computing a specific position that is a position on the outer edge line of the tool at which a tangent to the tool coincides with the target tangent in the X-axis-orthogonal cross section; and
a position setting processing of setting the relative position such that the target point and the specific position coincide with each other after machining of the target machining portion.

* * * * *